US011927037B2

(12) United States Patent
Rosales

(10) Patent No.: US 11,927,037 B2
(45) Date of Patent: Mar. 12, 2024

(54) MOTOR VEHICLE LOCK ARRANGEMENT

(71) Applicant: Brose Schließsysteme GmbH & Co. Kommanditgesellschaft, Wuppertal, Wuppertal (DE)

(72) Inventor: David Rosales, Rochester Hills, MI (US)

(73) Assignee: Brose Schließsysteme GmbH & Co. Kommanditgesellschaft, Wuppertal (DE)

( * ) Notice: Subject to any disclaimer, the term of this patent is extended or adjusted under 35 U.S.C. 154(b) by 73 days.

(21) Appl. No.: 16/599,541

(22) Filed: Oct. 11, 2019

(65) Prior Publication Data

US 2021/0108453 A1 Apr. 15, 2021

(51) Int. Cl.

| | |
|---|---|
| ***E05B 85/26*** | (2014.01) |
| ***E05B 57/00*** | (2006.01) |
| ***E05B 81/04*** | (2014.01) |
| ***E05B 83/18*** | (2014.01) |
| *E05B 81/16* | (2014.01) |
| *E05B 83/24* | (2014.01) |

(52) U.S. Cl.

CPC .............. *E05B 85/26* (2013.01); *E05B 57/00* (2013.01); *E05B 81/04* (2013.01); *E05B 83/18* (2013.01); *E05B 81/16* (2013.01); *E05B 83/24* (2013.01)

(58) Field of Classification Search

CPC .......... E05B 81/20; E05B 81/22; E05B 81/14; E05B 81/04; E05B 81/16; E05B 83/18; E05B 83/24; E05B 85/26; B62D 33/037; Y10S 292/23; Y10T 292/1082; Y10T 292/1047

See application file for complete search history.

(56) References Cited

U.S. PATENT DOCUMENTS

| | | | | |
|---|---|---|---|---|
| 8,528,950 | B2 * | 9/2013 | Organek | H01F 7/1638 292/216 |
| 10,155,460 | B2 * | 12/2018 | Schug | B60N 2/01583 |
| 10,309,130 | B2 * | 6/2019 | Schiffer | E05B 81/44 |
| 2017/0089112 | A1 | 3/2017 | Rosales et al. | |
| 2019/0100945 | A1 * | 4/2019 | Obita | E05B 77/04 |
| 2020/0232263 | A1 * | 7/2020 | Strole | E05C 3/12 |

FOREIGN PATENT DOCUMENTS

| | | | | |
|---|---|---|---|---|
| KR | 20180072013 A * | 6/2018 | | |
| WO | WO-2015139678 A1 * | 9/2015 | | E05B 81/90 |

* cited by examiner

*Primary Examiner* — Kristina R Fulton
*Assistant Examiner* — Noah Horowitz
(74) *Attorney, Agent, or Firm* — Dickinson Wright PLLC

(57) ABSTRACT

A motor vehicle lock arrangement for a hatch leaf with a motor vehicle lock, including a catch for the interaction with a lock striker, pivotable around a catch axis, and a pawl with a pawl arm, pivotable around a geometrical pawl axis, wherein the motor vehicle lock may be brought into a primary closed state, in which the catch is in its primary closed position and in holding engagement with the lock striker and the pawl arm is in its primary closed position and blocking the catch in its primary closed position, wherein the motor vehicle lock may be brought into an open state, the catch is in its open position and releasing the lock striker and in which the pawl arm is in its open position, the motor vehicle lock may include an inlet channel in the form of a recess for receiving the lock striker.

19 Claims, 4 Drawing Sheets

MOTOR VEHICLE LOCK ARRANGEMENT

TECHNICAL FIELD

The present disclosure relates to a motor vehicle lock arrangement for a hatch leaf.

BACKGROUND

A motor vehicle lock arrangement may be used with any kind of hatch leaf of a motor vehicle. Accordingly, the expression “hatch leaf” and “hatch arrangement” are to be understood in a brought sense. They include any kind of doors of a motor vehicle such as side doors or back doors as well as tailgates, liftgates, trunk lids or engine hoods. Those also include the rear hatch leaf of a pickup truck.

In order to provide a holding function for the hatch leaf in its closed position, the motor vehicle lock may include a catch for the interaction with a lock striker and a pawl for holding the catch in its primary closed position. In its primary closed position, the catch is in holding engagement with the lock striker, which leads to the hatch leaf to be held in its closed position.

SUMMARY

One or more problems underlying the disclosure may be to provide a motor vehicle lock arrangement, that may provide an increase in constructional flexibility.

According to at least one embodiment, the motor vehicle lock arrangement a motor vehicle lock, which may include a catch for the interaction with a lock striker, which catch is pivotable around a geometrical catch axis. The motor vehicle lock further may include a pawl with a pawl arm, which is pivotable around a geometrical pawl axis. The motor vehicle lock may be brought into a primary closed state, in which the catch is in its primary closed position and in holding engagement with the lock striker. In addition, in the primary closed state, the pawl arm is in its primary closed position and blocking the catch in its primary closed position.

Also, the motor vehicle lock may be brought into an open state, in which the catch is in its open position and releasing the lock striker and in which the pawl arm is in its open position and releasing the catch. The motor vehicle lock may also be brought into a preliminary closed position, which will be discussed later, and which is not relevant for the overall idea of the invention.

The present disclosure may disclose a new way of interaction between the catch on the one hand and the pawl arm on the other hand. Generally, it has been found, that for opening the motor vehicle lock, the pawl arm does not necessarily have to be moved away from the inlet channel as is known from the state of the art. As an example, it is proposed to do the exact opposite, namely to move the pawl arm along a control contour of the catch towards the inlet channel. Finally, it has been found, that it is even possible to move the pawl arm into the inlet channel, such that the pawl arm can provide additional functions as will be described.

As one example, it is proposed that during an opening sequence for releasing the lick striker from the catch, starting from the primary closed state, the pawl arm moves along a control contour of the catch towards the inlet channel, here and for example into the inlet channel, of the motor vehicle lock.

In one or more embodiments, as the pawl arm may well stay in contact with the catch via the control contour during the opening sequence, it is generally possible to prevent a loud snapping noise resulting from the pawl slipping off a blocking contour of the catch. Therefore, with a simple constructional measure it has been achieved, that the pawl arm slides along the control contour of the catch with low noise resulting from the opening sequence.

In one or more embodiments, with the pawl arm moving towards, and for example into, the inlet channel, it takes little constructional effort to have the pawl arm come into contact with the lock striker, pushing the lock striker out of the inlet channel of the motor vehicle lock as noted above. This may be advantageous, if the lock striker is undesirably fixed to the motor vehicle lock due to icing.

In one or more embodiments, with the proposed solution, it also takes only low constructional effort to realize a cinching function, if a corresponding drive arrangement for the pawl arm is realized. In this case, the pawl arm will drive the catch via the control contour, as will be described below.

In one or more embodiments, the new interaction between the catch and the pawl may result in a simple sensor based monitoring of the lock state. This is because the control contour of the catch may be used to guarantee that the pawl arm in its primary closed position forces the catch in its primary closed position as well. For sensing the primary closed state of the motor vehicle lock, it is then for example sufficient to monitor with a corresponding sensor, if the pawl arm is in its primary closed position.

The pushout function may be integrated into the opening sequence of the motor vehicle lock, guaranteeing a high operational safety of every single opening sequence.

As another example, in the primary closed state of the motor vehicle lock, a primary blocking contour of the pawl arm and a primary blocking contour of the catch are in blocking engagement with each other. Depending on the geometry of the primary blocking contour of the pawl arm, the torque on the catch may be translated into a resulting torque on the pawl arm in the sense of a gearing. In a preferred embodiment, the resulting torque on the pawl arm drives the pawl arm in its closing direction. In this alternative it is preferred that an end stop is assigned to the pawl such that this resulting torque only leads to driving the pawl into the end stop. However, in another preferred embodiment, the gearing between the catch and the pawl arm is such that the torque on the catch is translated into no torque on the pawl at all, which is also known as a neutral layout of the interaction between the catch and the pawl arm.

According to one or more embodiments, the pawl arm and the catch may each include a primary blocking contour, and when the motor vehicle lock is in the primary closed state, the primary blocking contour of the pawl arm may engage the primary blocking contour of the catch to block the catch in the catch primary closed position During the closing sequence, the lock striker may at least initiate the closing sequence by engaging the pawl arm and/or the catch.

According to one or more embodiments, the pawl and the catch may be spring biased, such that during the opening sequence the catch may automatically reach its open position and such that during the closing sequence, the pawl may automatically reach its primary closed position.

A considerable reduction may noise generation during the opening sequence may be achieved by one or more embodiments. For example, the control contour of the catch may adjacent to the primary blocking contour of the catch, such that during the opening sequence, the pawl arm may simply slide from the blocking contour of the catch to the control contour of the catch, with the generation of hardly any noise.

According to this embodiment, the geometrical catch axis and the geometrical pawl axis are parallel to each other. This allows the catch and the pawl arm to be arranged in one and the same plane, which may lead to an optimized use of available space.

According to one or more embodiments, a drive arrangement may be provided to allow for additional motorized functions such as a motorized opening sequence, a motorized pushout sequence, or a motorized cinching sequence. One or more of the proposed solutions makes it possible to realize all those motorized functions with hardly any constructional effort.

The motor vehicle lock may be moved to a secondary closed state.

BRIEF DESCRIPTION OF THE DRAWINGS

In the following, the invention will be described with reference to exemplary embodiments illustrated in the drawing. In the drawings show FIG. 1 a schematic view of a motor vehicle comprising a proposed motor vehicle arrangement with a motor vehicle lock, FIG. 2 an opening sequence of the motor vehicle lock according to FIG. 1 in steps a) to e), FIG. 3 a closing sequence of the motor vehicle lock according to FIG. 1 in the steps a) to e) and FIG. 4 another embodiment of the motor vehicle lock according to FIG. 1 in the preliminary closed state.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The known motor vehicle lock arrangement (US 2017/0089112 A1), which is the starting point for the invention, shows a motor vehicle lock with a catch, a pawl interacting with the catch and an inlet channel in the form of a recess for receiving the striker during a closing sequence. The interaction between the catch and the pawl according to the known motor vehicle lock has proven to show a high operational safety. However, when it comes to the reduction of noise during the opening sequence and to the integration of comfort functions such as a motorized opening sequence for releasing the lock striker from the catch or a cinching sequence for driving the catch in its closing direction, considerable constructional measures have to be taken. Those constructional measures are often costly, such that the constructional flexibility of the known motor vehicle lock arrangement is a challenge.

Figure 1:
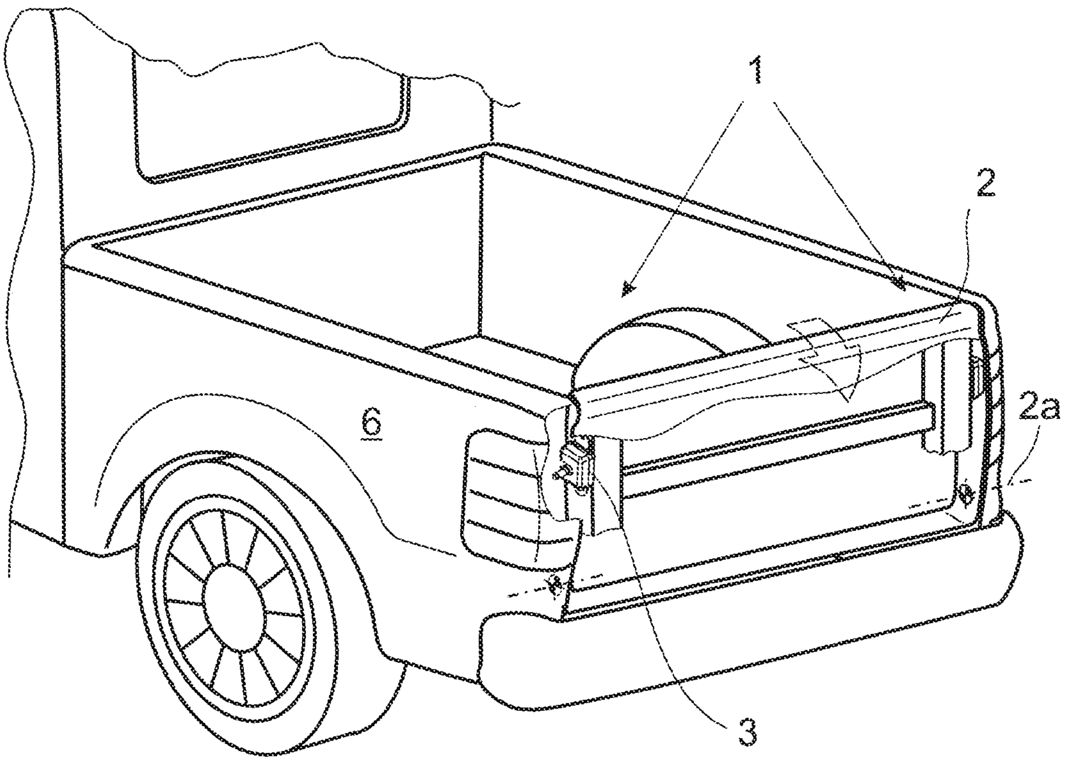

The motor vehicle shown in FIG. 1 may include a motor vehicle lock arrangement 1 for a hatch leaf 2. Regarding the broad understanding of the expressions “hatch leaf” and “hatch arrangement”, reference is made to the introductory part of the specification.

The hatch leaf 2 is, for example, pivotable around a hatch axis 2*a*, which is aligned basically horizontally. It is also possible, that the hatch axis 2*a* is aligned vertically.

The proposed motor vehicle lock arrangement 1 may include a motor vehicle lock 3. Just as a matter of completeness, it may be pointed out, that the hatch leaf 2 is assigned not only one motor vehicle lock 3, but two motor vehicle locks, that are arranged on opposite sides of the hatch leaf 2. In the following, only the motor vehicle lock 3 on the left side of the hatch leaf 2 is described. All explanations given to this motor vehicle lock 3 are fully applicable to the motor vehicle lock located on the opposite side of the hatch leaf 2.

FIG. 2*a*) shows, that the motor vehicle lock 3 may include a catch 4 for the interaction with a lock striker 5. The lock striker 5 may be, for example, located at the motor vehicle body 6. It is also possible, that the lock striker 5 is positioned at the hatch leaf 2, such that the motor vehicle lock 1 is then positioned at the motor vehicle body 6.

The catch 4 is pivotable around a geometrical catch axis 4*a* between a primary closed position (FIG. 2*a*)) and an open position (FIG. 2*e*)). The motor vehicle lock 3 also may include a pawl 7 with a pawl arm 8, which pawl arm 8 is pivotable around a geometrical pawl axis 8*a*.

The motor vehicle lock 3 may be brought into a primary closed state (FIG. 2*a*)), in which the catch 4 is in its primary closed position and in holding engagement with the lock striker 5 and in which the pawl arm 8 is in its primary closed position and blocking the catch 4 in its primary closed position.

The motor vehicle lock 3 may also be brought into an open state (FIG. 2*e*)), in which the catch 4 is in its open position and releasing the lock striker 5 and in which the pawl arm 8 is in its open position.

As shown in FIG. 2*a*), the motor vehicle lock 3 may include an inlet channel 9 in the form of a recess 10 for receiving the lock striker 5. The recess 10 may be a cutout in a lock plate 11, which lock plate 11 carries the catch 4 and the pawl arm 8.

Figure 2:
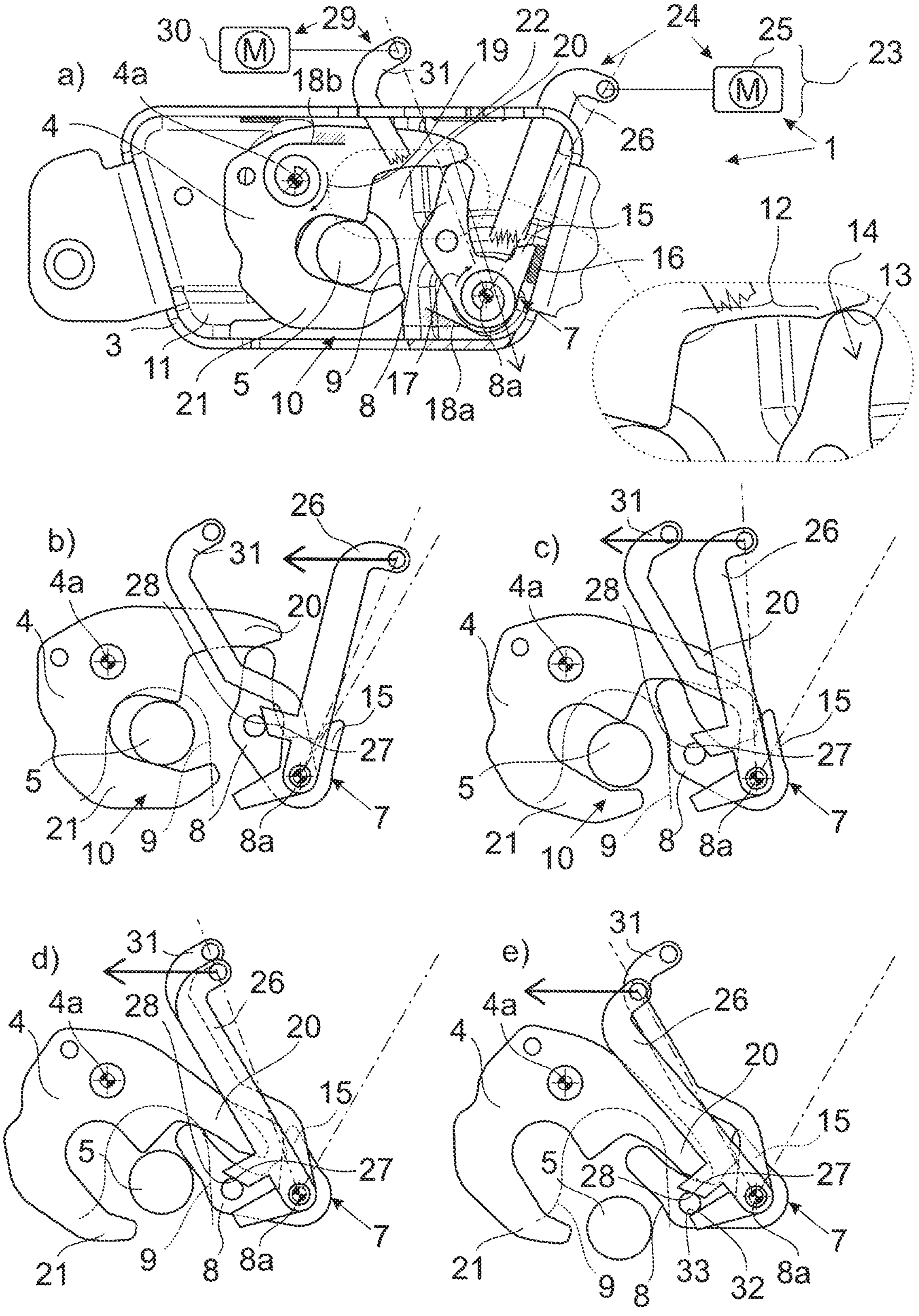

It is essential for the invention, that during an opening sequence for releasing the lock striker 5 from the catch 4, starting from the primary closed state (FIG. 2*a*)), the pawl arm 8 moves along a control contour 12 of the catch 4 towards the inlet channel 9 of the motor vehicle lock 3. The opening sequence is represented by the sequence of the FIGS. 2*a*) to *e*). FIG. 2 shows, that during the opening sequence, the pawl arm 8 actually moves into the inlet channel 9 of the motor vehicle lock 3, such that the pawl arm 8 may come into engagement with the lock striker 5 to push the lock striker 5 out of the inlet channel 9. This pushout of the lock striker 5 is represented by the sequence of FIGS. 2*d*), *e*).

It is to be pointed out that the movement of the pawl arm 8, namely pivoting the pawl arm 8 along the control contour 12, includes continuously sliding the pawl arm 8 along the control contour 12. However, it also includes the pawl arm 8 to move along the control contour 12, without necessarily contacting the control contour 12.

The detailed representation in FIG. 2*a*) shows, that in the primary closed state of the motor vehicle lock 3, for blocking the catch 4 in its primary closed position, a primary blocking contour 13 of the pawl arm 8 is in blocking engagement with a primary blocking contour 14 of the catch 4. Here, the gearing between the catch 4 and the pawl arm 8 may cause a torque on the catch 4, which acts clockwise in FIG. 2, to be translated into a torque on the pawl arm 8, which acts clockwise in FIG. 2 as well.

As the pawl 7 may include a blocking arm 15, which, in the primary closed position of the pawl arm 8 engages an end stop 16, the resulting torque on the pawl arm 8 leads to a force fit engagement with the end stop 16 and in the end to a stable position of the pawl arm 8. As noted above, the primary blocking contours 13, 14 may also be designed such that no resulting torque is acting on the pawl arm 8 at all, that goes back on the torque on the catch 4.

At this point it may be pointed out that the torque on the catch 4 may go back on a spring bias of the catch 4 to be explained later and on a possible sealing pressure of the hatch leaf 2, which goes back on a seal assigned to the hatch leaf 2, which is being compressed during a closing sequence.

A closing sequence for establishing a holding engagement with the lock striker 5 is represented by the steps shown in FIGS. 3*a*) to *e*). During the closing sequence, the pawl arm 8 moves along the control contour 12, until the primary blocking contour 13 of the pawl arm 8 comes into blocking engagement with the primary blocking contour 14 of the catch 4 (sequence of FIGS. 3*c*), *d*), *e*)). As one example, the closing sequence, here and preferably, is caused by the lock striker 5, accordingly by a manual movement of the hatch leaf 2. In detail, the lock striker 5 comes into engagement with the pawl arm 8 and/or the catch 4 and causes the pawl arm 8 to move along the control contour 12, as may be derived from FIG. 3*b*), *c*).

As shown in FIGS. 3*b*), *c*), the lock striker 5 comes into engagement with the pawl arm 8, which in the end leads to the pawl arm 8 to move along the control contour 12, until the primary blocking contour 13 of the pawl arm 8 comes into blocking engagement with the primary blocking contour 14 of the catch 4 (FIG. 3*e*)). In the preferred embodiment, this closing sequence is partly motorized including a motorized cinching sequence, as will be explained below.

Here and preferably, the pawl arm 8 is spring biased in its closing direction 17, namely into the direction of its primary closed position. For this, the pawl arm 8 is assigned a corresponding spring 18*a*. In addition, the catch 4 is spring biased in its opening direction 19, namely into the direction of its open position. For this, the catch 4 is assigned a corresponding spring 18*b*.

Without any motorized drive, the spring bias of the pawl arm 8 ensures, that, during the closing sequence, the pawl arm 8 reaches its primary closed position. In this context it is interesting, that according to FIG. 3*a*), the spring bias of the catch 4 is preferably strong enough to hold the pawl arm 8 in its open position against the spring bias of the pawl arm 8, which urges the pawl arm 8 into its closing direction.

A particularly smooth opening sequence and closing sequence may be realized, by arranging the control contour 12 of the catch 4 adjacent to the primary blocking contour 14 of the catch 4, as shown in FIG. 2*a*). Here and preferably, the control contour 12 and the primary blocking contour 14 merge into each other.

Figure 3:
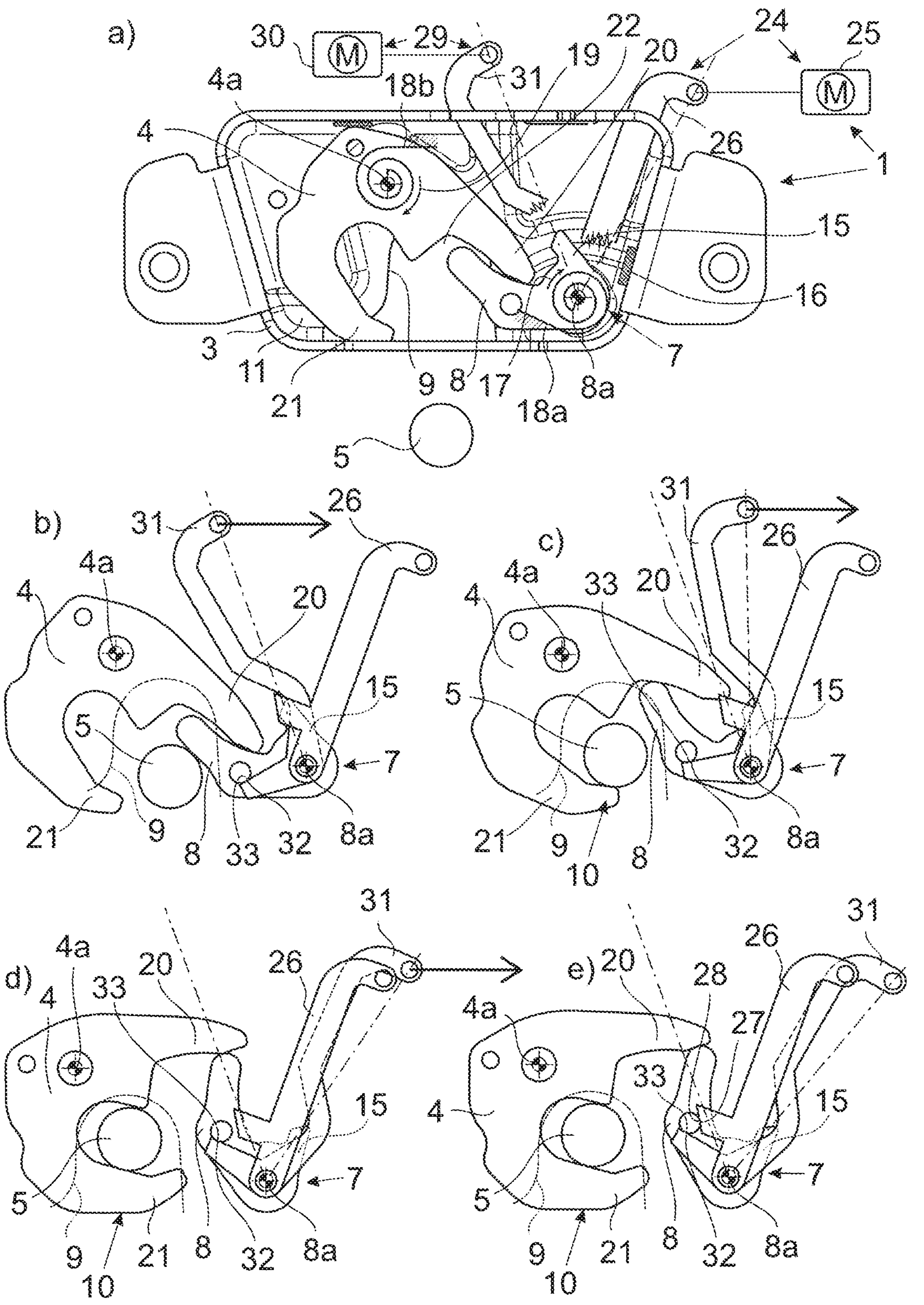

The construction shown in FIGS. 2, 3 is rather compact, as the geometrical catch axis 4*a* and the geometrical pawl axis 8*a* are parallel to each other.

The detailed construction of the catch 4 may vary according to the respective field of use. Here and preferably, the catch 4 may include a control arm 20 extending from the rest of the catch 4, which control arm 20 may include at least the primary blocking contour 14 and the control contour 12 of the catch 4.

As shown in FIGS. 2, 3, in addition, the catch 4 may include a holding arm 21 for the holding engagement with the lock striker 5, such that the control arm 20 and the holding arm 21 form a mouth like section 22. The mouth like section 22 receives the lock striker 5 in the primary closed state of the motor vehicle lock 3. This design of the catch 4 combines high mechanical robustness with a potential for easy realization of the proposed solution.

The proposed solution allows for a particularly simple way of monitoring the state of the motor vehicle lock 3. This is, because the pawl arm 8 and the catch 4, as one example the pawl arm 8 and the control contour 12 of the catch 4, are arranged such that the pawl arm 8 in its primary closed position forces the catch 4 into its primary closed position. This means that the catch 4 is guaranteed to stay in its primary closed position, as long as the pawl arm 8 is in its primary closed position. Therefore, it is sufficient to monitor the position of the pawl arm 8. Generally, it may also be foreseen, that only the catch 4 is being monitored accordingly.

As shown in the drawings, the motor vehicle lock arrangement 1 may include a drive arrangement 23 for motorized movement of the pawl arm 8.

In one preferred embodiment, the drive arrangement 23 is directed to realizing a motorized opening sequence for releasing the lock striker 5 from the catch 4. Accordingly, the drive arrangement 23 preferably may include an opening drive 24 with a motor 25 and a drive lever 26. For realizing the motorized opening sequence, the motor 25 moves the drive lever 20, which drives the pawl arm 8 into its opening direction, preferably into its open position. For this, the drive lever 26 may include an engagement surface 27, which may engage a counter engagement surface 28 of the pawl arm 8. This motorized opening sequence may be derived from FIGS. 2*a*) to *e*).

The above noted, motorized opening sequence includes a pushout sequence for pushing out the lock striker 5 out of the inlet channel 9. This is preferably realized again by driving the pawl arm 8 in its opening direction into engagement with the lock striker 5 to push out the lock striker 5 out of the inlet channel 9. This is shown by the sequence of FIGS. 2*d*), *e*). As noted above, it is preferred, that the pushout sequence is part of the opening sequence.

In addition, the drive arrangement 23 may include a cinching drive 29 with a motor 30 and a drive lever 31. With this additional arrangement, it is possible to realize a motorized cinching sequence for moving the catch 4 in its closing direction. This is shown in the sequence of FIGS. 3*a*) to *e*). Here, the drive lever 31 is moved by the motor 30 of the cinching drive 29, such that the pawl arm 8 is driven in its closing direction. This is preferably triggered by the lock striker 5 having moved the pawl arm 8 over a certain distance during the closing sequence. For the detection of this movement of the pawl arm 8, a sensor may well be assigned to the pawl arm 8. After triggering the cinching sequence, the pawl arm 8 is driven in its closing direction, here and preferably into its primary closed position, as represented by the sequence of FIGS. 3*c*), d). With the movement of the pawl arm 8, the catch 4 is driven in its closing direction, here and preferably into its primary closing position, via the control contour 12. For the above noted cinching sequence, the drive lever 31 may include an engagement surface 32, which, during the motorized cinching sequence, comes into engagement with a counter engagement surface 33 at the pawl.

At that point it may be emphasized, that the above noted interaction between the catch 4 and the pawl arm 8 is especially preferred. This interaction is designed such that moving the pawl arm 8 in its closing direction leads to a sliding contact of the pawl arm 8 along the control contour 12, which drives the catch 4 into its closing direction. This is the reason why it is possible to realize a cinching function simply by driving the pawl arm 8 into its closing direction.

It is of particular importance, that in case of a purely manual closing sequence, the drive arrangement 23 does not work against the movement of the pawl arm 8. This is guaranteed in the embodiment shown in FIGS. 2, 3 as, starting from FIG. 3*b*), the lock striker 5 can move both the catch 4 and the pawl arm 8 into the respective primary closed position, without having to move any one of the driver levers 26, 31.

Figure 4:
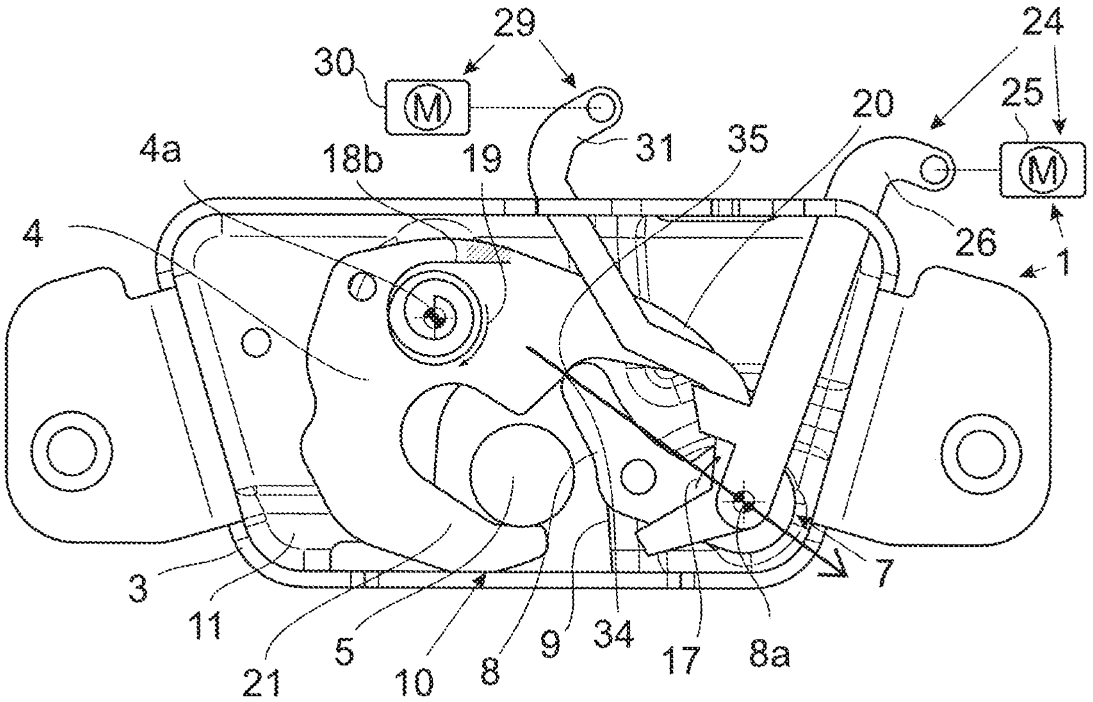

FIG. 4 shows a second embodiment of the motor vehicle lock 3 of the motor vehicle lock arrangement 1, shown in FIG. 1. The general structure of the motor vehicle lock 3 shown in FIG. 4 is identical to the general structure of the motor vehicle lock 3 shown in FIGS. 2, 3. Insofar, reference is made to the explanations given above.

In addition to the features of the motor vehicle lock 3 shown in FIGS. 2, 3, the motor vehicle lock 3 shown in FIG. 4 may be brought into a secondary closed state, which secondary closed state is actually shown in FIG. 4. In this secondary closed state, the catch 4 is in its secondary closed position, which is between its primary closed position and its open position. As shown in FIG. 4, in its secondary closed position, the catch 4 is in holding engagement with the lock striker 5. Further, in the secondary closed state, the pawl arm 8 is in its secondary closed position, which is between its primary closed position and its open position, thereby blocking the catch 4 in its secondary closed position.

Here and preferably, the blocking of the catch 4 in its secondary closed position is realized by providing the pawl arm 8 with a secondary blocking contour 34 and providing the catch 4 with a secondary blocking contour 35, which secondary blocking contours 34, 35 are in blocking engagement with each other. This is realized by designing the secondary blocking contours 34, 35 such that the torque on the catch 4 is being translated into a force leading through the pawl axis 8*a* and accordingly generating no torque on the pawl arm 8 at all. This guarantees that the pawl arm 8 stays in its secondary closed position, until it is being moved into its open position by the opening drive 24 or into its primary closed position by the cinching drive 29.

Finally, it may be contemplated, that the function of the opening drive 24 may be realized by a manual actuation arrangement with a manual actuation lever, which may be connected to a manual door handle or the like. This may be realized in addition or alternatively to the motorized opening drive 24. Accordingly, the proposed motor vehicle lock arrangement 1 may be operated fully manually, partly manually or in a fully motorized way.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle lock for use in a hatch leaf, the motor vehicle lock comprising:

a catch configured to engage a lock striker and having a first primary blocking contour, wherein the catch is pivotable about a geometrical catch axis, and a pawl including a pawl arm and a second primary blocking contour, wherein the pawl is pivotable about a geometrical pawl axis, wherein the motor vehicle lock is configured to change to a primary closed state, wherein when the motor vehicle lock is in the primary closed state the catch is in a catch primary closed position and holds and engages the lock striker and the pawl arm is in a pawl-arm primary closed position and blocks the catch in a blocking-catch primary closed position by engaging the first and second blocking contours, wherein the motor vehicle lock is configured to change to an open state, wherein when the motor vehicle lock is in the open state, the catch is in a catch open position such that the catch disengages and releases the lock striker and the pawl arm is in a pawl-arm open position in which the first and second primary blocking contours are disengaged, wherein the motor vehicle lock includes an inlet channel formed by a recess configured to receive the lock striker, wherein, during an opening sequence, the catch moves from the catch primary closed position to release the lock striker and the second primary blocking contour of the pawl arm moves along a control contour of the catch towards or into the inlet channel, wherein in the primary closed state, the second primary blocking contour of the pawl arm is farther away from the inlet than in the open state.

2. The motor vehicle lock of claim 1, wherein during the opening sequence, the pawl arm moves to engage the lock striker to push the lock striker away from or out of the inlet channel.

3. The motor vehicle lock of claim 1, wherein during a closing sequence, the catch moves to engage the lock striker and the pawl arm moves along the control contour, such that the second primary blocking contour of the pawl arm engages the first primary blocking contour of the catch.

4. The motor vehicle lock of claim 3, wherein during the closing sequence, the lock striker engages the pawl arm and/or the catch, to move the pawl arm along the control contour, such that the second primary blocking contour of the pawl arm engages the first primary blocking contour of the catch.

5. The motor vehicle lock of claim 1, wherein the pawl arm is biased by a spring towards the pawl-arm primary closed position and/or wherein the catch is spring biased towards the catch primary closed position.

6. The motor vehicle lock of claim 1, wherein the control contour of the catch is adjacent to the first primary blocking contour of the catch.

7. The motor vehicle lock of claim 1, wherein the geometrical catch axis and the geometrical pawl axis are parallel to each other.

8. The motor vehicle lock of claim 1, wherein the catch includes a control arm, wherein the control arm forms the first primary blocking contour and the control contour.

9. The motor vehicle lock of claim 1, wherein the pawl arm and the control contour of the catch are arranged such that when the pawl arm is in the pawl primary closed position, the pawl arm moves the catch to the catch primary closed position.

10. The motor vehicle lock of claim 1, further comprising a drive arrangement configured to provide a for motorized movement of the pawl arm.

11. The motor vehicle lock of claim 10, wherein during the opening sequence, the pawl arm moves in an opening direction to release the lock striker from the catch.

12. The motor vehicle lock of claim 10, wherein during a pushout sequence, the drive arrangement is configured to move the pawl arm in an opening direction to engage and move the lock striker out of the inlet channel.

13. The motor vehicle lock of claim 10, wherein during a cinching sequence, the drive arrangement is configured to move the pawl arm in a closing direction to the pawl-arm primary closed position to move the catch in a closing direction along the control contour.

14. The motor vehicle lock of claim 1, wherein the motor vehicle lock is configured to change to a secondary closed state, wherein when the motor vehicle lock is in the secondary closed state, the catch is in a catch secondary closed position, between the catch primary closed position and the catch open position, and the catch in holding engagement with the lock striker and the pawl arm being in its secondary closed position, which is between its primary closed position and its open position, and blocking the catch in its secondary closed position.

15. The motor vehicle lock of claim 8, wherein the catch includes a holding arm configured to engage and hold the lock striker, and wherein the control arm and the holding arm form a mouth shaped section.

16. A lock configured to releasably secure a hatch leaf to a vehicle body and change between a primary closed state and an open state, the lock comprising:

a lock plate defining a recess and an inlet channel, wherein the recess is configured to receive a striker fixed to either the hatch leaf or the vehicle body;

a catch forming a control contour, coupled to the lock plate and pivotable about a catch axis, wherein when the lock is in the primary closed state, the catch is in a catch-primary closed position and is configured to engage the striker; and a pawl coupled to the lock plate, including a pawl arm having a primary blocking contour, and pivotable about a pawl axis, wherein when the lock is in the primary closed state, the pawl arm is in a pawl-arm primary closed position in which the primary blocking contour engages with the catch to hold the catch in a blocking-catch primary closed position, wherein as the lock changes to the open state, the catch moves from the catch-primary closed position to a catch open position to disengage and release the striker and the primary blocking contour of the pawl arm moves along the control contour towards or into the inlet channel, wherein in the primary closed state, a second primary blocking contour of the pawl arm is further away from the inlet than in the open state.

17. The lock of claim 16, wherein as the lock changes to the open state, the pawl arm moves to push the striker away from or out of the inlet channel.

18. The lock of claim 16, wherein the pawl arm and the control contour of the catch are arranged such that when the pawl arm is in the pawl primary closed position, the pawl arm moves the catch to the catch primary closed position.

19. A lock configured to releasably secure a hatch leaf to a vehicle body and change between a primary closed state and an open state, the lock comprising:

a lock plate defining a recess and an inlet channel, wherein the recess is configured to receive a striker fixed to either the hatch leaf or the vehicle body;

a catch forming a control contour, coupled to the lock plate and pivotable about a catch axis, wherein when the lock is in the primary closed state, the catch is in a catch-primary closed position to engage the striker; and a pawl coupled to the lock plate, including a pawl arm having a primary blocking contour, and pivotable about a pawl axis, wherein when the lock is in the primary closed state, the pawl arm is in a pawl-arm primary closed position in which the primary blocking contour engages with the catch to hold the catch in a blocking-catch primary closed position; and a motorized drive arrangement configured to move the pawl arm, wherein as the lock changes to the open state, the catch moves from the catch-primary closed position to a catch open position to disengage and release the striker and the primary blocking contour of the pawl arm moves along the control contour towards or into the inlet channel, wherein in the primary closed state, a second primary blocking contour of the pawl arm is further away from the inlet than in the open state.

* * * * *